United States Patent
Fan et al.

(10) Patent No.: US 8,943,051 B2
(45) Date of Patent: Jan. 27, 2015

(54) LEXICAL ANSWER TYPE CONFIDENCE ESTIMATION AND APPLICATION

(71) Applicant: International Business Machines Corporation, Armonk, NY (US)

(72) Inventors: James J. Fan, Hawthorne, NY (US); David A. Ferrucci, Yorktown Heights, NY (US); David C. Gondek, Providence, RI (US); Aditya A. Kalyanpur, Westwood, NJ (US); Adam P. Lally, Cold Spring, NY (US); James W. Murdock, Millwood, NY (US); Wlodek W. Zadrozny, Tarrytown, NY (US)

(73) Assignee: International Business Machines Corporation, Armonk, NY (US)

(*) Notice: Subject to any disclaimer, the term of this patent is extended or adjusted under 35 U.S.C. 154(b) by 28 days.

(21) Appl. No.: 13/920,513

(22) Filed: Jun. 18, 2013

(65) Prior Publication Data

US 2013/0282363 A1 Oct. 24, 2013

Related U.S. Application Data

(63) Continuation-in-part of application No. 13/242,290, filed on Sep. 23, 2011, now Pat. No. 8,510,296.

(60) Provisional application No. 61/386,029, filed on Sep. 24, 2010.

(51) Int. Cl.
  G06F 17/00 (2006.01)
  G06F 17/28 (2006.01)
  G09B 7/00 (2006.01)

(52) U.S. Cl.
  CPC .............. *G06F 17/2872* (2013.01); *G09B 7/00* (2013.01)

USPC ............. 707/728; 707/722; 707/726; 706/12; 706/14

(58) Field of Classification Search
  None
  See application file for complete search history.

(56) References Cited

U.S. PATENT DOCUMENTS

| | | |
|---|---|---|
| 3,559,995 A | 2/1971 | Steadman |
| 4,594,686 A | 6/1986 | Yoshida |
| 4,599,691 A | 7/1986 | Sakaki et al. |
| 4,829,423 A | 5/1989 | Tennant et al. |
| 4,921,427 A | 5/1990 | Dunn |
| 5,374,894 A | 12/1994 | Fong |
| 5,414,797 A | 5/1995 | Vassiliadis et al. |
| 5,513,116 A | 4/1996 | Buckley et al. |
| 5,546,316 A | 8/1996 | Buckley et al. |
| 5,550,746 A | 8/1996 | Jacobs |
| 5,559,714 A | 9/1996 | Banks et al. |
| 5,634,051 A | 5/1997 | Thomson |
| 5,794,050 A | 8/1998 | Dahlgren et al. |
| 6,487,545 B1 | 11/2002 | Wical |

(Continued)

OTHER PUBLICATIONS

Katz et al., "Omnibase: Uniform Access to Heterogeneous Data for Question Answering", 2002.

(Continued)

*Primary Examiner* — Hung Le
(74) *Attorney, Agent, or Firm* — Scully, Scott, Murphy & Presser, P.C.

(57) ABSTRACT

A system, method and computer program product for automatically estimating the confidence of a detected LAT to provide a more accurate overall score for an obtained candidate answer. A confidence "score" or value of each detected LAT is obtained, and the system and method performs combining the confidence score with a degree of match between a LAT and an AnswerType of the candidate answer to provide improved overall score for the candidate answer.

21 Claims, 9 Drawing Sheets

(56) References Cited

U.S. PATENT DOCUMENTS

| | | | |
|---|---|---|---|
| 6,763,341 | B2 | 7/2004 | Okude |
| 6,829,603 | B1 | 12/2004 | Chai et al. |
| 6,947,885 | B2 | 9/2005 | Bangalore et al. |
| 6,983,252 | B2 | 1/2006 | Matheson et al. |
| 7,092,928 | B1 | 8/2006 | Elad et al. |
| 7,136,909 | B2 | 11/2006 | Balasuriya |
| 7,139,752 | B2 | 11/2006 | Broder et al. |
| 7,181,438 | B1 | 2/2007 | Szabo |
| 7,216,073 | B2 | 5/2007 | Lavi et al. |
| 7,293,015 | B2 | 11/2007 | Zhou |
| 7,483,828 | B2 * | 1/2009 | Abir ................................. 704/8 |
| 7,558,778 | B2 | 7/2009 | Carus et al. |
| 7,590,606 | B1 | 9/2009 | Keller et al. |
| 7,711,547 | B2 * | 5/2010 | Abir ................................. 704/7 |
| 7,730,085 | B2 | 6/2010 | Hassan et al. |
| 7,805,303 | B2 | 9/2010 | Sugihara et al. |
| 7,860,706 | B2 * | 12/2010 | Abir ................................. 704/4 |
| 7,877,343 | B2 * | 1/2011 | Cafarella et al. ................ 706/20 |
| 8,612,208 | B2 * | 12/2013 | Cooper et al. ..................... 704/9 |
| 2001/0032211 | A1 | 10/2001 | Kuzumaki |
| 2003/0033287 | A1 | 2/2003 | Shanahan et al. |
| 2004/0049499 | A1 | 3/2004 | Nomoto et al. |
| 2004/0064305 | A1 | 4/2004 | Sakai |
| 2004/0122660 | A1 | 6/2004 | Cheng et al. |
| 2004/0254917 | A1 | 12/2004 | Brill et al. |
| 2005/0033711 | A1 * | 2/2005 | Horvitz et al. ................... 706/50 |
| 2005/0050614 | A1 * | 3/2005 | Leung ........................... 2/209.13 |
| 2005/0060301 | A1 | 3/2005 | Seki et al. |
| 2005/0086045 | A1 | 4/2005 | Murata |
| 2005/0086222 | A1 | 4/2005 | Wang et al. |
| 2005/0114327 | A1 | 5/2005 | Kumamoto et al. |
| 2005/0143999 | A1 | 6/2005 | Ichimura |
| 2005/0256700 | A1 | 11/2005 | Moldovan et al. |
| 2005/0289168 | A1 | 12/2005 | Green et al. |
| 2006/0053000 | A1 | 3/2006 | Moldovan et al. |
| 2006/0106788 | A1 | 5/2006 | Forrest |
| 2006/0122834 | A1 | 6/2006 | Bennett |
| 2006/0141438 | A1 | 6/2006 | Chang et al. |
| 2006/0173834 | A1 | 8/2006 | Brill et al. |
| 2006/0204945 | A1 | 9/2006 | Masuichi et al. |
| 2006/0206472 | A1 | 9/2006 | Masuichi et al. |
| 2006/0206481 | A1 | 9/2006 | Ohkuma et al. |
| 2006/0235689 | A1 | 10/2006 | Sugihara et al. |
| 2006/0277165 | A1 | 12/2006 | Yoshimura et al. |
| 2006/0282414 | A1 | 12/2006 | Sugihara et al. |
| 2006/0294037 | A1 | 12/2006 | Horvitz et al. |
| 2007/0022099 | A1 | 1/2007 | Yoshimura et al. |
| 2007/0022109 | A1 | 1/2007 | Imielinski et al. |
| 2007/0073683 | A1 | 3/2007 | Kobayashi et al. |
| 2007/0078842 | A1 | 4/2007 | Zola et al. |
| 2007/0094285 | A1 | 4/2007 | Agichtein et al. |
| 2007/0118518 | A1 | 5/2007 | Wu et al. |
| 2007/0136246 | A1 | 6/2007 | Stenchikova et al. |
| 2007/0196804 | A1 | 8/2007 | Yoshimura et al. |
| 2007/0203863 | A1 | 8/2007 | Gupta et al. |
| 2008/0077570 | A1 | 3/2008 | Tang et al. |
| 2009/0192966 | A1 | 7/2009 | Horvitz et al. |
| 2009/0259642 | A1 | 10/2009 | Cao et al. |
| 2009/0287678 | A1 * | 11/2009 | Brown et al. ..................... 707/5 |
| 2009/0292687 | A1 | 11/2009 | Fan et al. |
| 2010/0100546 | A1 | 4/2010 | Kohler |
| 2010/0138402 | A1 * | 6/2010 | Burroughs et al. ........... 707/706 |
| 2010/0235311 | A1 * | 9/2010 | Cao et al. ........................ 706/46 |
| 2010/0235343 | A1 | 9/2010 | Cao et al. |
| 2011/0066587 | A1 | 3/2011 | Ferrucci et al. |
| 2011/0078192 | A1 | 3/2011 | Murdock, IV |
| 2011/0106617 | A1 * | 5/2011 | Cooper et al. ............. 705/14.49 |
| 2011/0123967 | A1 * | 5/2011 | Perronnin et al. ............ 434/178 |
| 2013/0041921 | A1 * | 2/2013 | Cooper et al. ................ 707/780 |

OTHER PUBLICATIONS

Ligozat et al., "Lexical validation of answers in Question Answering", 2007.

Lin et al., "Question Answering Techniques for the World Wide Web", 2003.

Chu-Carroll et al., "In Question-Answering, Two Heads are Better than One", HLT-NAACL'03, May-Jun. 2003, pp. 24-31, Edmonton, Canada.

Ferrucci et al., "Towards the Open Advancement of Question Answering Systems," IBM Technical Report RC24789, Computer Science, Apr. 22, 2009.

Moldovan et al., "COGEX: A Logic Prover for Question Answering," Proceedings of HLT-NAACL 2003, May-Jun. 2003, pp. 87-93, Edmonton, Canada.

Simmons, "Natural Language Question-Answering Systems: 1969," Communications of the ACM, Jan. 1970, pp. 15-30, 13(1).

Voorhees et al., "Overview of the TREC 2005 Question Answering Track," Proceedings of the Fourteenth Text Retrieval Conference, 2005, Gaithersburg, Maryland.

Weinstein et al., "Agents Swarming in Semantic Spaces to Corroborate Hypotheses," AAMAS'04, Jul. 19-23, 2004, New York, New York, USA, Copyright 2004 ACM 1-58113-864-4/04/007.

Prager et al., "A Multi-Strategy, Multi-Question Approach to Question Answering," In New Directions in Question-Answering, Maybury, M. (Ed.), AAAI Press, 2004.

Strzalkowski et al., "Advances in Open-Domain Question-Answering," Springer, 2006 (background information only—the front cover, copyright page and table of contents only).

Balahur, "Going Beyond Traditional QA Systems: Challenges and Keys in Opinions Question Answering," Coling 2010: Poster Volume, pp. 27-35, Beijing, Aug. 2010.

Blitzer, Domain Adaptation of Natural Language Processing Systems, Presented to the Faculties of the University of Pennsylvania in Partial Fulfillment of the Requirements for the Degree of Doctor of Philosophy, 2007.

University of Illinois at Urbana-Champaign, Department of Computer Science, Research, 2010, http://cs.illinois.edu/research?report=UIUCDCS-R-2008-2974.

National Center for Biotechnology Information (NCBI), Entrez the Life Sciences Search Engine, Oct. 28, 2009.

Chang et al., "Creating an Online Dictionary of Abbreviations from MEDLINE," J Am Med Inform Assoc. 2002; 9:612-620. DOI 10.1197/jamia.M1139.

Adar, "SaRAD: a Simple and Robust Abbreviation Dictionary," Bioinformatics, Mar. 2004, pp. 527-533, vol. 20 Issue 4.

Cunningham et al., "The GATE User Guide", http://gate.ac.uk/releases/gate-2.0alpha2-build484/doc/userguide.html, This version of the document is for GATE version 2 alpha 1, of Mar. 2001, pp. 1-13.

"INDRI Language modeling meets inference networks," http://www.lemurproject.org/indri/, last modified May 23, 2011; pp. 1-2.

"Apache UIMA ConceptMapper Annotator Documentation," Written and maintained by the Apache UIMA Development Community, Version 2.3.1, Copyright 2006, 2011 The Apache Software Foundation, pp. 1-7, http://uima.apache.org/sandbox.html#concept.mapper.annotator.

"Question answering," From Wikipedia, the free encyclopedia, http://en.wikipedia.org/wiki/Question_answering, last modified Sep. 8, 2011.

Aditya et al., "Leveraging Community-built Knowledge for Type Coercion in Question Answering," Proceedings of ISWC 2011.

Pasca, "Question-Driven Semantic Filters for Answer Retrieval", International Journal of Pattern Recognition and Artificial Intelligence (IJPRAI), World Scientific Publishing, SI, vol. 17, No. 5, Aug. 1, 2003, pp. 741-756.

Cucerzan et al., "Factoid Question Answering over Unstructured and Structured Web Content", In Proceedings of the 14th Text Retrieval Conference TREC 2005, Dec. 31, 2005.

Molla et al., "AnswerFinder at TREC 2004", Proceedings of the 13th Text Retrieval Conference TREC 2004, Dec. 31, 2004.

Wikipedia, List of poets, Sep. 19, 2011, http://en.wikipedia.org/wiki/List_of_poets.

Delicious, The freshest bookmarks that are flying like hotcakes on Delicious and beyond, Sep. 21, 2011, http://delicious.com/.

Wikipedia, List of poets from the United States, Sep. 19, 2011, http://en.wikipedia.org/wiki/List_of_poets_from_the_United_States.

* cited by examiner

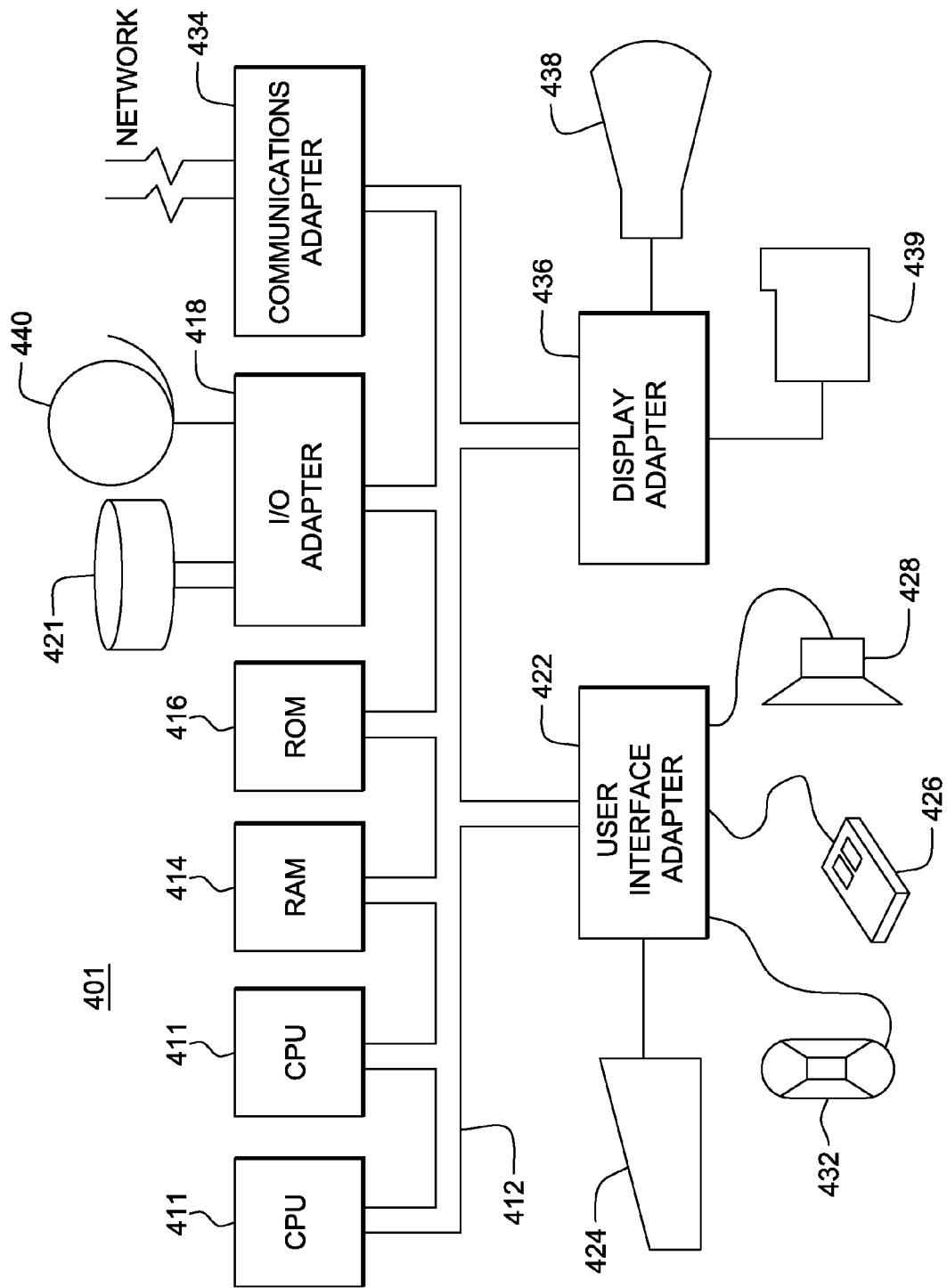

LEXICAL ANSWER TYPE CONFIDENCE ESTIMATION AND APPLICATION

CROSS-REFERENCE TO RELATED APPLICATIONS

The present invention relates to and claims the benefit of the filing date of commonly-owned, co-pending U.S. patent application Ser. No. 13/242,290 filed Sep. 23, 2011 which claims the benefit of U.S. Provisional Patent Application No. 61/386,029, filed Sep. 24, 2010, the entire contents and disclosure of which is incorporated by reference as if fully set forth herein.

BACKGROUND

An introduction to the current issues and approaches of question answering (QA) can be found in the web-based reference http://en.wikipedia.org/wiki/Question_answering. Generally, QA is a type of information retrieval. Given a collection of documents (such as the World Wide Web or a local collection) the system should be able to retrieve answers to questions posed in natural language. QA is regarded as requiring more complex natural language processing (NLP) techniques than other types of information retrieval such as document retrieval, and it is sometimes regarded as the next step beyond search engines.

QA research attempts to deal with a wide range of question types including: fact, list, definition, How, Why, hypothetical, semantically-constrained, and cross-lingual questions. Search collections vary from small local document collections, to internal organization documents, to compiled newswire reports, to the World Wide Web.

Closed-domain QA deals with questions under a specific domain, for example medicine or automotive maintenance, and can be seen as an easier task because NLP systems can exploit domain-specific knowledge frequently formalized in ontologies. Open-domain QA deals with questions about nearly everything, and can only rely on general ontologies and world knowledge. On the other hand, these systems usually have much more data available from which to extract the answer.

Alternatively, closed-domain QA might refer to a situation where only a limited type of questions are accepted, such as questions asking for descriptive rather than procedural information.

Access to information is currently dominated by two paradigms. First, a database query that answers questions about what is in a collection of structured records. Second, a search that delivers a collection of document links in response to a query against a collection of unstructured data, for example, text or html.

A major unsolved problem in such information query paradigms is the lack of a computer program capable of accurately answering factual questions based on information included in a collection of documents that can be either structured, unstructured, or both. Such factual questions can be either broad, such as "what are the risks of vitamin K deficiency?", or narrow, such as "when and where was Hillary Clinton's father born?"

It is a challenge to understand the query, to find appropriate documents that might contain the answer, and to extract the correct answer to be delivered to the user.

SUMMARY

In one aspect there is provided a computing infrastructure and methodology that conducts question and answering that addresses the problem of computing wrong LATs for a particular query.

In one aspect, a system, method and computer program product is provided that automatically estimates the confidence of a query detected LAT to provide a more accurate overall score for the candidate answer. A confidence "score" or value of each detected LAT is obtained, and the system and method performs combining the confidence score with a degree of match between a LAT and a candidate answer to provide improved overall score for the candidate answer.

Thus, in one aspect, there is provided a system and method for automatically generating answers to questions. The method comprises: determining a lexical answer type (LAT) associated with an input query; computing a first score for the input query LAT, wherein the first score is indicative of a quality of the query LAT; obtaining a candidate answer to the input query from an information source; determining an answer type (AT) for the candidate answer; comparing the query LAT with the candidate answer AT; computing a second score representing a degree of match between the compared query LAT with the candidate answer AT; and combining the first score and the second score to provide a total score indicative of a quality of the candidate answer, wherein a processing device automatically performs one or more of the determining a query LAT, computing the first score and second score, obtaining candidate answers, determining a AT, comparing and combining In one aspect, the computing a first score for the query LAT associated with the input query comprises: extracting a set of features describing the determined query LAT; and, applying a model to the feature set to produce a LAT confidence value representing an estimated accuracy of the determined query LAT, the first score comprising the confidence value.

In a further aspect, there is provided a system for automatically generating answers to questions comprising: a memory storage device; one or more processor devices, each in communication to the memory device and configured for performing a method comprising: determining a lexical answer type (LAT) associated with an input query; computing a first score for the query LAT, wherein the first score is indicative of a quality of the query LAT; obtaining a candidate answer to the input query from an information source; determining an answer type (AT) for the candidate answer; comparing the query LAT with the candidate answer AT; computing a second score representing a degree of match between the compared query LAT with the candidate answer AT; and, combining the first score and the second score to provide a total score indicative of a quality of the candidate answer.

In yet a further aspect, there is provided a method for extracting features from a query comprising a text string. The method comprises: identifying a syntactic pattern rule associated with the query, the pattern rule identified from a set of pattern rules that define common lexical answer types (LATs), a first feature of the extracted features comprising an identified pattern rule; checking for prior instances of a detected lexical answer type (LAT) and computing a LAT word frequency based on the prior instances, a second feature of the extracted features comprising a computed frequency of a query word being a candidate LAT; obtaining a parse tree data structure associated with the query; identifying grammatical relations amongst words associated with the candidate LAT in the parse tree structure, a third feature of the extracted features comprising a part of speech of the candidate LAT, and determining whether the candidate LAT word co-references some other word in the query recognized as a LAT, a fourth feature of the extracted features comprising a co-reference information, wherein one or more programmed processor devices performs the identifying a syntactic pattern rule, checking for prior instances, obtaining the parse tree data structure, identifying grammatical relations, and determining LAT word co-references.

BRIEF DESCRIPTION OF THE DRAWINGS

The objects, features and advantages of the invention are understood within the context of the Detailed Description, as set forth below. The Detailed Description is understood within the context of the accompanying drawings, which form a material part of this disclosure, wherein:

FIG. 9 illustrates an exemplary hardware configuration to run method steps described in FIGS. 2A, 2B, 3-4, 6-7 in one embodiment.

DETAILED DESCRIPTION

Commonly-owned, co-pending U.S. patent application Ser. No. 12/126,642, titled "SYSTEM AND METHOD FOR PROVIDING QUESTION AND ANSWERS WITH DEFERRED TYPE EVALUATION", incorporated by reference herein, describes a QA system and method in which answers are automatically generated for questions. More particularly, it involves comparing the lexical types determined from the question to the lexical types associated with each candidate answer that is derived from a search. The lexical answer type requested by the question is referred to herein as a "lexical answer type" or "LAT." The lexical types that are associated with each candidate answer is referred to herein as an answer type or "AT".

Figure 1:
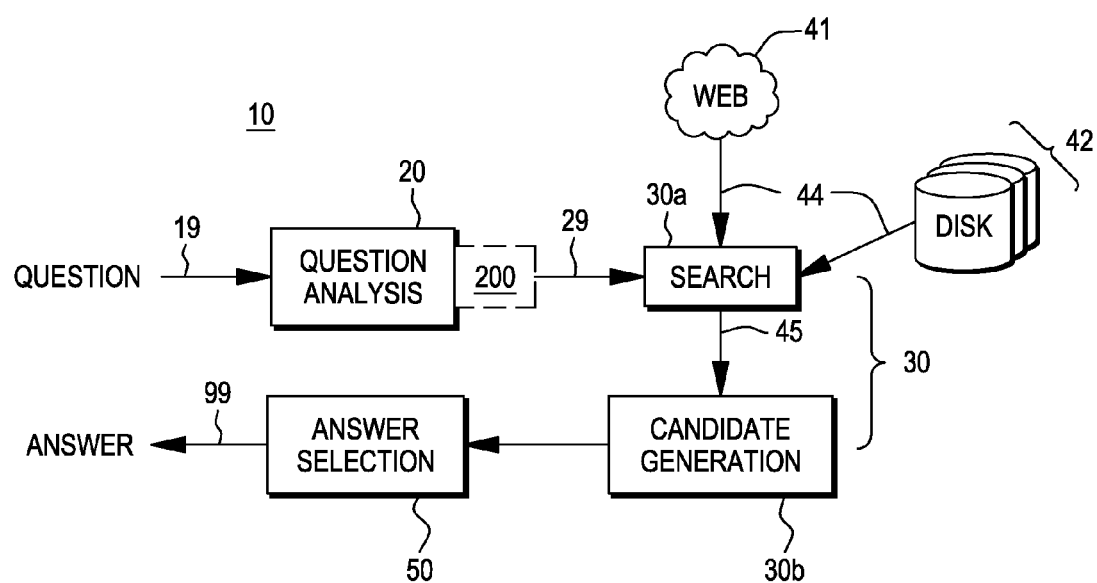
FIG. 1 shows a high level logical architecture 10 of a question/answering method in which the present invention may be employed.

Generally, a question answering (QA) system returns a precise answer to a given question in natural language along with justifications by consulting a possibly heterogeneous collection of structured, semi-structured and unstructured information resources. FIG. 1 illustrates the major components that comprise a canonical question answering system 10 and their workflow.

The question analysis component 20 receives a natural language question 19 (e.g., "Who is the 42nd president of the United States?") and analyzes the question to produce, minimally, the semantic type of the expected answer (in this example, "president"), and optionally other analysis results for downstream processing. A search component 30a utilizing a core search engine formulates queries from the output 29 of question analysis and consults various resources such as the World Wide Web 41 or one or more knowledge resources, e.g., databases, knowledge bases 42, to retrieve documents, passages, web-pages, database tuples, etc., that are relevant to answering the question. The candidate answer generation component 30b then extracts from the search results 45 potential (candidate) answers to the question, which are then scored and ranked by the answer selection component 50 to produce a final ranked list of answers with associated confidence scores.

In a QA system with deferred type evaluation, after the extraction of candidate answers (i.e., candidate answer instances to queries obtained from a data corpus or the Internet), there is typically performed answer-typing, i.e., a determination of associations between searched candidate answers and their lexical types. The determined candidate answer type is compared against a computed lexical answer type ("LAT") of the query which is detected by question analysis, and an evaluation is made in determining the correctness of the answer.

A Type Coercion (TyCor) process is one in which an answer type (AT) of a candidate answer is "coerced" to the question LAT based on several techniques. The coercion process may involve mapping the candidate answer to an instance in a structured resource, obtaining its types and mapping them to the LAT. The results of the "coercion" are referred to as a TyCor score.

A LAT of the question/query is the type (i.e. the descriptor) of the referent of the entity that is a valid answer to the question/query. In practice, LAT is the descriptor of the answer detected by a natural language understanding module comprising a collection of patterns and/or a parser with a semantic interpreter.

Thus, question and answer systems may employ a Lexical Answer Type (LAT) detection processing block 200 in the query analysis module 20 of FIG. 1. The LAT further represents the question terms that identify the semantic type of the correct answer. Thus, a LAT may be detectable in a question through pattern LAT detection rules. These rules are implemented and are encoded or learned by machines automatically through association rule learning. A natural language understanding model may implement these rules.

However, no natural language processing module is perfect and erroneous LATs are detected. Wrong LATs can seriously reduce the performance of QA systems because wrong types of answers will be judged as more likely to be the correct answers.

Figure 5:
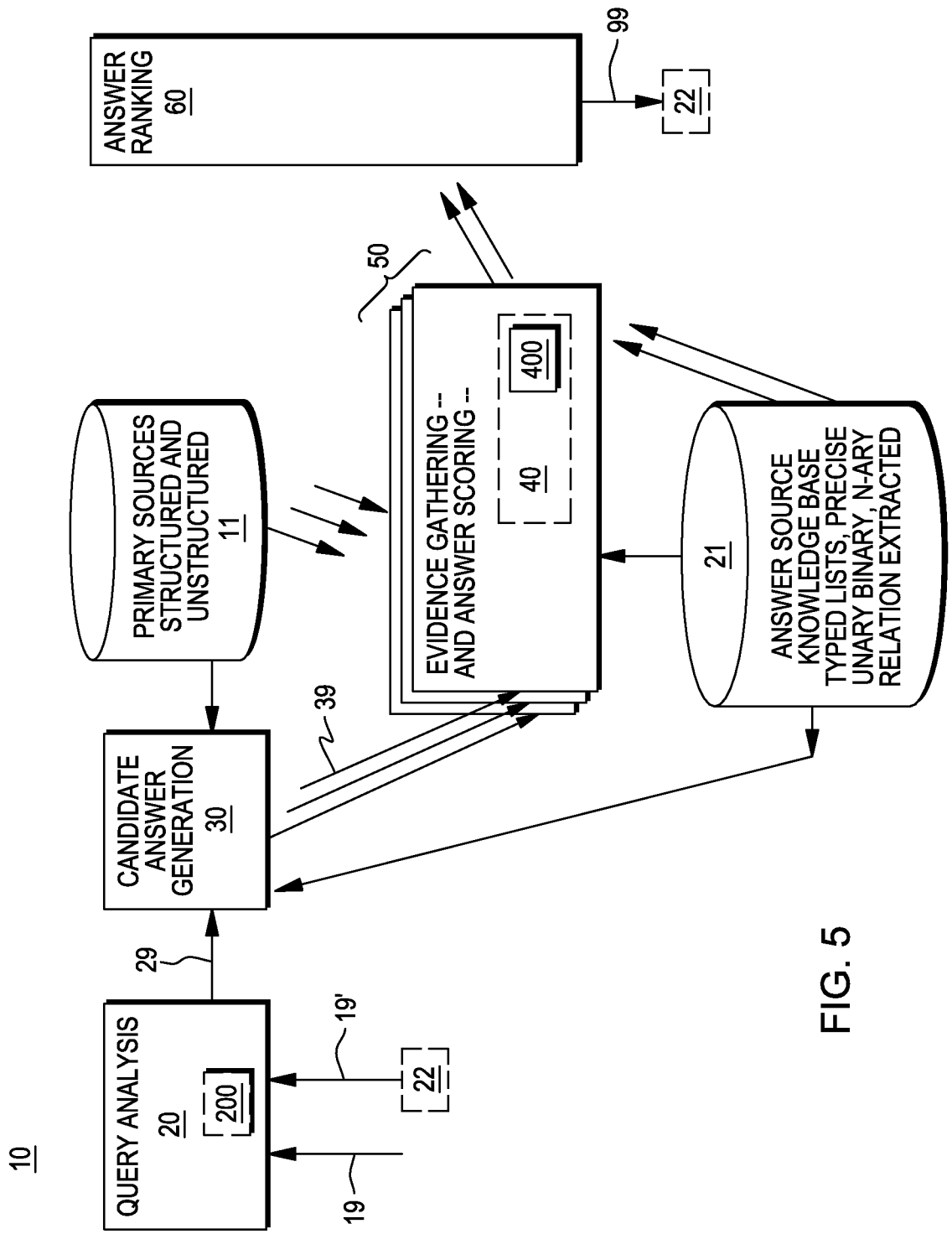
FIG. 5 shows a further high level logical architecture 10 of a question/answering method in which the present invention may be employed.

Further details on a QA system 10 are discussed with respect to FIG. 5. Evidence gathering and answer scoring functions 50 are programmed processing components that receive (1) a "lexical answer type" (LAT), e.g., a text string describing some concept and (2) "candidate answer" input(s), e.g., a text string describing some entity. The programmed processing components generate an output including a judgment (e.g., a score) representing to what degree the entity is an instance of the concept. As described in FIGS. 6 and 7 below, this is used as part of answer scoring functions, for example, based on computed candidate answer types (ATs).

Figure 3:
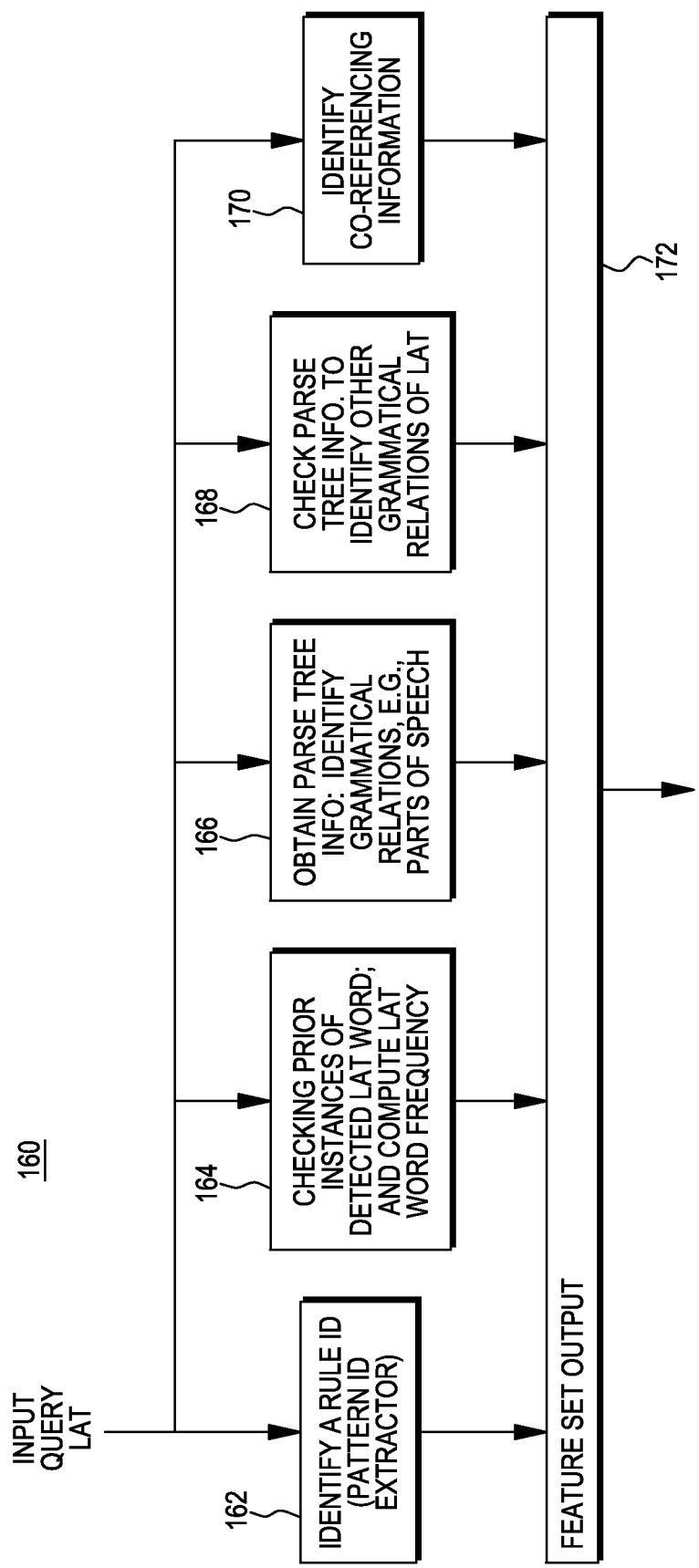
FIG. 3 is a flow diagram illustrating feature(s) generation production performed at step 160 of the flow diagram of FIG. 2A.

As described below with respect to FIG. 3, after processing an input query to determine a LAT and searching and obtaining one or more candidate answers, there is performed for each candidate answer received the steps of matching the candidate against instances in a database which results in generating an output data structure, including the matched instances 132a; looking (searching) for evidence that the candidate answer has the required LAT and retrieving LT(s) associated with those instances in the knowledge base (KB) 132b; and attempting to match LAT(s) with LT(s) (e.g., as determined by a matching function that using a parser, a semantic interpreter and/or a simple pattern matcher) and producing a score representing the degree of match 132c. More particularly, the candidate AT and query LAT(s) are represented as lexical strings. Production of the score, referred to as a "TyCor" (Type Coercion) score, is comprised of the three steps: (1) candidate answer to instance matching, (2) instance to type association extraction, and (3) LAT to type matching. The score reflects the degree to which the candidate may be "coerced" to the LAT, where higher scores indicate a better coercion.

In one embodiment, the present disclosure extends and complements the effectiveness of the QA system and method described in co-pending U.S. patent application Ser. No. 12/126,642 by providing additional functionality to provide a better quality score for the candidate answer. Specifically, a QA system such as shown in FIG. 1 performs an automatic estimation of the confidence of a detected query LAT to produce a LAT confidence score. The LAT confidence score is combined with the degree of match between a LAT and a answer type (AT) of the candidate answer to provide a better overall score for the candidate answer. In other words, a confidence score or value of each detected LAT is obtained and the system and method performs combining the LAT confidence score with the TyCor score to improve the overall score for the candidate answer. The attendant advantages include a QA system will be more tolerant of LAT detection errors and candidate answers are more likely to be correct when LAT confidence is taken into account.

Figure 2A:
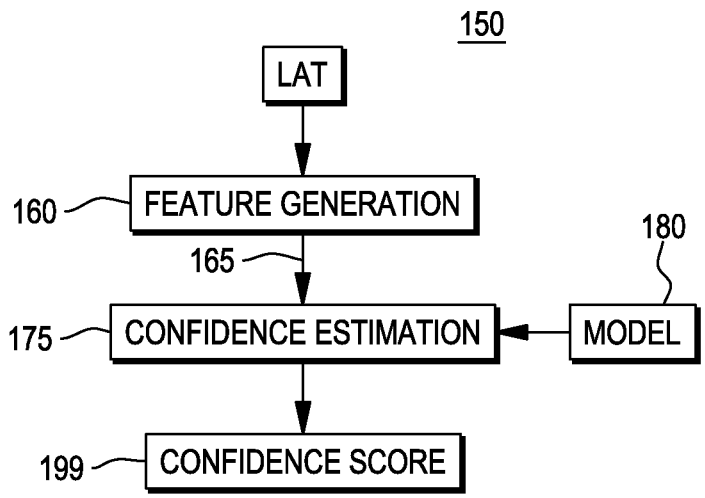
FIG. 2A is a flow diagram of a LAT confidence estimation process and software architecture for generating a LAT confidence estimation score.

With respect to computing a LAT confidence score, reference is had with respect to FIG. 2A, which depicts the process of LAT confidence estimation such as may be performed as part of, or in conjunction with the LAT detection processing block 200 in query analysis module 20, shown in FIG. 1. In the processing, after computing a lexical answer types (LAT) for a query using the process as described in commonly-owned, co-pending U.S. patent application Ser. No. 12/126, 642, the confidence "score" or confidence value of each LAT is computed.

FIG. 2A particularly shows a computer-implemented process 150 for LAT confidence estimation including two components: a first feature generation component 160 that extracts a set of features 165 that describe a candidate LAT (e.g., a word in the question). Example features may include, but are not limited to: 1) the application of a pattern rule ("Rule ID") from a set of rules that define common LATs, e.g., the rule with the id "thisWhatNoun" that describes syntactic patterns that match a noun modified by determiners such as "this" or "these", as the noun "president" in "This president did what . . . "; 2) a prior frequency of the word being a candidate LAT; 3) parse information to determine the grammatical relations associated with the LAT, e.g., how candidate LAT word relates to other parts of the parse tree; 4) Other grammatical information, such as part-of-speech of the LAT; and, 5) co-reference information that determines if the candidate LAT word co-references some other word recognized as a LAT, etc. The confidence estimation processing component 175 takes the set of LAT features, and a model 180 is applied to the set to produce a confidence score 199 associated with the LAT. The model 180 can be constructed manually or automatically from a set of training instances.

Thus for example, a pattern may be found in the question that leads to the LAT based on processing according to a Prolog® logic program in one embodiment. For example, appropriate weights for particular identified pattern(s) are determined by past training data, i.e., data used in previous processes for manually identifying LATs in the past. During LAT confidence estimation, the text surrounding the LAT is processed, e.g., using Prolog® logic program, to determine if any of the patterns fit. That is, a Prolog® logic program may be used in one embodiment to perform pattern rule matching. If a pattern fits, the ruleID associated with the identified pattern is provided and based on a prior confidence for that particular pattern, a weight is assigned to the feature. If none of the patterns match, there would be no weight associated with that feature.

An embodiment of the feature generation component 160 at the question analysis stage is now described with reference to FIG. 3. As shown, the query LAT is input to and processed in parallel in plural modules that each performs a specific feature extraction function. The plural modules include: a process 162 for identifying a pattern Rule ID from a set of rules that define common LATs; a process 164 for checking prior instances of a detected LAT word, e.g., from a collection of manually annotated data and computing a LAT word frequency based on an amount of prior instances; a parse tree checking process 166 to determine parts of speech of the candidate LAT (e.g., a word type such as a noun, verb, adjective, etc.); a process 168 for identifying grammatical relations associated with the LAT, e.g., how candidate LAT word relates to other parts of the parse tree; and a process 170 for identifying co-reference information that determines if the candidate LAT word co-references some other word recognized as a LAT (e.g., a question: "This president, who was a general during the Revolutionary War . . . ") provides two LATs (a president and a general) and if it is known that the word "president" is a LAT, then the word "general" is most likely a LAT as well as the candidate input LAT word "general" co-references the known LAT president. The output 172 of the processing blocks 162-170 provides a feature set having content including, but not limited to, one or more of: a Boolean (e.g., a grammatical relations, or a co-reference indicating whether the candidate LAT references another LAT or not); a numeric feature (e.g., word as LAT frequency); and a category (e.g., a part of speech such as a noun). The output feature set is then input to the confidence estimation module 175. The confidence estimation unit 175 receives the feature set, and the trained model 180 is applied to the feature set to produce an estimated LAT confidence score. In one embodiment, the feature set includes a list of numbers (e.g. 1, 0, 0.234, 1, 1, . . . ). Categorical features can be turned into a set of Boolean features (e.g. part-of-speech can be turned into is_noun, is_verb, is_adj, is_adv, is_prep).

In one embodiment, a feature set of Boolean, categorical values, and number values are input to the prior trained model. For the case of Boolean values or categorical values, for example, these may be represented in the feature set as a binary number such as 0 of 1. For example, a value of 0 or 1 may be associated with respective False or True feature set Boolean values.

With respect to the trained model 180, one embodiment is a machine learning model configured to combine the different features and weigh them to produce the final score for LAT confidence estimation. Any machine learning model may be used which is a mathematical model to determine how the different features of the feature set should be weighted. The mathematical model includes the weights for each type of feature, and given a particular input of feature set values, the values are input to the model and the model produces the score. The individual feature values are variables to the model equation (a function with different weights for each variable)

and the application of the model a value is given to each of the variables to produce a number. The model can be constructed manually or automatically from a set of training instances.

In one embodiment, the trained model 180 is a logistic regression model a description of which is described in a reference entitled Machine Learning, Tom Mitchell, McGraw Hill, 1997, incorporated herein by reference. In other embodiments, a support vector machine model may be used as described in a reference entitled "Support Vector Machines and other kernel-based learning methods" by John Shawe-Taylor and Nello Cristianini, Cambridge University Press, 2000. Further, a maximum entropy machine model may be found such as described in a reference entitled "A maximum entropy approach to natural language processing" by Adam L. Berger, et al. in Computational Linguistics Journal Volume 22 Issue 1, March 1996. Otherwise, a rule-based or decision-tree based model may be implemented.

An example logistic regression model that could be used shown as equation 1) as follows:

$$f(x_1, \ldots, x_n) = \frac{1}{e^{-z} + 1} \quad 1)$$

where $x_1, \ldots, x_n$ are feature values, and, in one embodiment, $$z = c + \Sigma_{i=1}^{n} = a_i x_i$$

where $a_1, \ldots, a_n$ are coefficients and the constant c are assigned during the training of a model. In one non-limiting example, a particular model may have coefficients assignments such as:
$a_1$=0.484, x1=thisWhatRule fired
$a_2$=2.8671, $x_2$=heShePronounRule fired
$a_3$=12.587 $x_3$=prior probability . . . .

Figure 4:
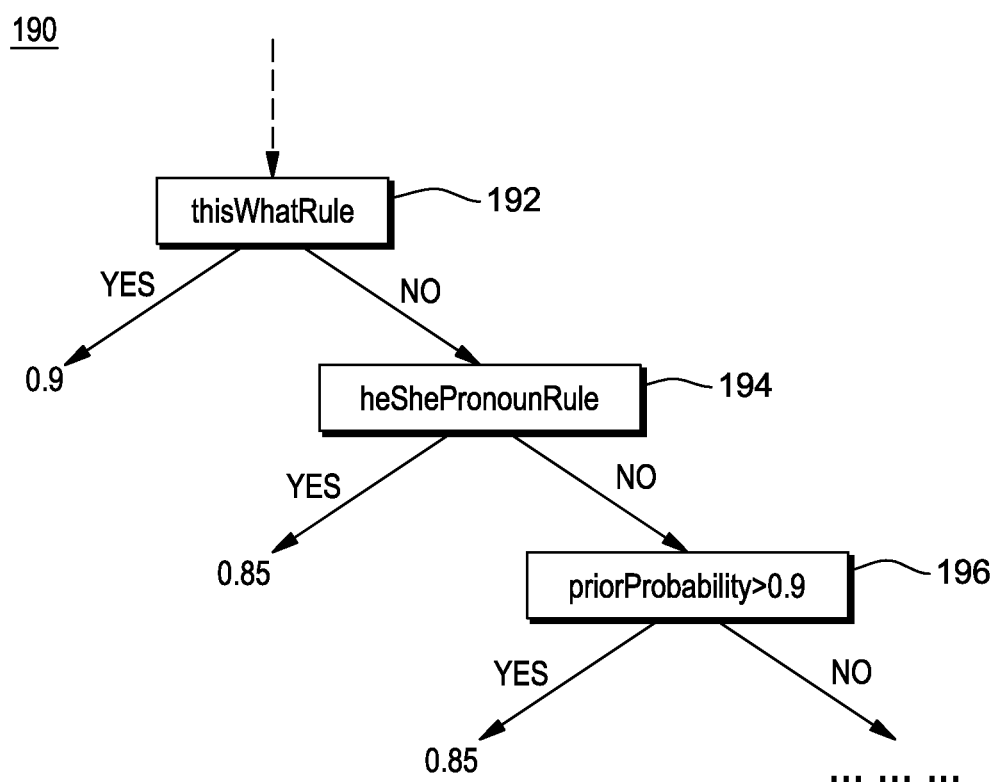
FIG. 4 depicts an example portion of a decision tree model 190 that is traversed for computing a query LAT confidence score.

FIG. 4 shows a further example of a model in the form of a decision tree data structure 190 which includes a series of decision points (e.g., nodes 192, 194, 196 in the tree) and different decisions (branches in the tree). In the example shown, the decisions are whether the input fits a particular pattern or not. Each pattern/rule has an associated name, such as "thisWhatRule" which detects patterns such as "this X . . . " in a question. If a pattern fits the input, then a particular confidence is returned as the LAT. Processing of decision tree data structure 190 includes automatically traversing the trained decision tree and computing a score at each decision step, e.g., steps 192, 194, 196, etc. that is used for computing the confidence score.

As mentioned, during QA processing, a determination is made as to whether the candidate answer is an instance of the query LAT. As the LAT detection may have errors, there is produced the estimated confidence score associated with the LAT to improve the results of the type-matching score (the TyCor), i.e., by combining the computed LAT confidence score with the raw TyCor score.

Figure 2B:
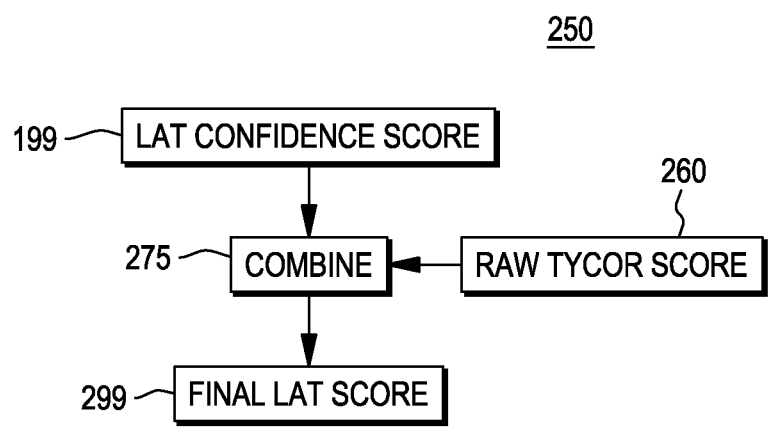
FIG. 2B is a flow diagram depicting an application of a LAT confidence estimation.

FIG. 2B describes a programmed process 250 for applying an estimated LAT confidence score 199 to produce a modified Tycor score. In the programmed LAT confidence application process 250 a single step is performed at a combining unit 275 that combines a LAT confidence estimate 199 and the raw Tycor score 260 to produce a final score 299. In one embodiment, the LAT confidence score may be a number from 0 to 1, and this may be multiplied by the raw TyCor score to compute the final TyCor score. The combination of LAT confidence score with raw Tycor score is implemented in a variety of ways, such as a confidence weighted average.

Given a query having one or more candidate LATs, the LAT confidence score is treated as a weight. For example, each LAT has a weight associated with it represented by the LAT confidence score. Given an answer candidate and associated raw TyCor score for each LAT, an overall score is estimated as the sum of each weight confidence multiplied by the type-matching (TyCor) score for each LAT. Thus, for the example query described herein above:
    "This president, who was a general during the Revolutionary War . . . "
for the detected two LATs "president" and "general" a total confidence weighted average for the candidate answer "George Washington" is computed as a sum of a first total representing the weighted confidence score (e.g., 0.8) for "general" multiplied by its respective TyCor score (e.g., 1.0) combined with a second total representing the weighted confidence score for "president" (0.95) multiplied by its respective TyCor (e.g., 1.0). In general, given a query with one or more detected LATs, a total weighted confidence score is computed as follows:

Total confidence weighted average score=(confidence score$_{LAT1}$)(TyCor$_{LAT\ 1}$)+(confidence score$_{LAT2}$) (TyCor$_{LAT\ 2}$)+ . . . +(confidence score$_{LATn}$)(Ty-Cor$_{LATn}$)

This summation is computed to yield the confidence weighted average for "n" detected LATs of a single query.

FIG. 5 shows a QA system diagram described in U.S. patent application Ser. No. 12/126,642 depicting a high-level logical QA architecture 10. Generally, as shown in FIG. 5, the high level logical architecture 10 includes a Query Analysis module 20 implementing functions for receiving and analyzing a user query or question. The term "user" may refer to a person or persons interacting with the system, or refers to a computer system 22 generating a query by mechanical means, and where the term "user query" refers to such a mechanically generated query and context 19'. A candidate answer generation module 30 is provided to implement a search for candidate answers by traversing structured, semi structured and unstructured sources contained in a Primary Sources module 11 and in an Answer Source Knowledge Base (KB) module 21 containing collections of relations and lists extracted from primary sources. All the sources of information can be locally stored or distributed over a network, including the Internet.

The Candidate Answer generation module 30 of architecture 10 generates a plurality of output data structures containing candidate answers based upon the analysis of retrieved data. In FIG. 5, an Evidence Gathering module 50 interfaces with the primary sources 11 and knowledge base 21 for concurrently analyzing the evidence based on passages having candidate answers, and scores each of candidate answers, in one embodiment, as parallel processing operations. In one embodiment, the architecture may be employed utilizing the Common Analysis System (CAS) candidate answer structures as is described in commonly-owned, issued U.S. Pat. No. 7,139,752, the whole contents and disclosure of which is incorporated by reference as if fully set forth herein.

As depicted in FIG. 5, the Evidence Gathering module 50 comprises a Candidate Answer Scoring module 40 for analyzing a retrieved passage and scoring each of candidate answers of a retrieved passage. The Answer Source Knowledge Base (KB) 21 may comprise one or more databases of structured or semi-structured sources (pre-computed or otherwise) comprising collections of relations (e.g., Typed Lists). In an example implementation, the Answer Source knowledge base may comprise a database stored in a memory storage system, e.g., a hard drive.

An Answer Ranking module 60 provides functionality for ranking candidate answers and determining a response 99 returned to a user via a user's computer display interface (not shown) or a computer system 22, where the response may be an answer, or an elaboration of a prior answer or request for clarification in response to a question—when a high quality answer to the question is not found. A machine learning implementation is further provided where the "answer ranking" module 60 includes a trained model component (not shown) produced using a machine learning techniques from prior data.

The processing depicted in FIG. 5, may be local, on a server, or server cluster, within an enterprise, or alternately, may be distributed with or integral with or otherwise operate in conjunction with a public or privately available search engine in order to enhance the question answer functionality in the manner as described. Thus, the method may be provided as a computer program product comprising instructions executable by a processing device, or as a service deploying the computer program product. The architecture employs a search engine (e.g., a document retrieval system) as a part of Candidate Answer Generation module 30 which may be dedicated to searching the Internet, a publicly available database, a web-site (e.g., IMDB.com) or, a privately available database. Databases can be stored in any storage system, non-volatile memory storage systems, e.g., a hard drive or flash memory, and can be distributed over the network or not.

As mentioned, the system and method of FIG. 5 makes use of the Common Analysis System (CAS), a subsystem of the Unstructured Information Management Architecture (UIMA) that handles data exchanges between the various UIMA components, such as analysis engines and unstructured information management applications. CAS supports data modeling via a type system independent of programming language, provides data access through a powerful indexing mechanism, and provides support for creating annotations on text data, such as described in (http://www.research.ibm.com/journal/sj/433/gotz.html) incorporated by reference as if set forth herein. It should be noted that the CAS allows for multiple definitions of the linkage between a document and its annotations, as is useful for the analysis of images, video, or other non-textual modalities (as taught in the herein incorporated reference U.S. Pat. No. 7,139,752).

In one embodiment, the UIMA may be provided as middleware for the effective management and interchange of unstructured information over a wide array of information sources. The architecture generally includes a search engine, data storage, analysis engines containing pipelined document annotators and various adapters. The UIMA system, method and computer program may be used to generate answers to input queries. The method includes inputting a document and operating at least one text analysis engine that comprises a plurality of coupled annotators for tokenizing document data and for identifying and annotating a particular type of semantic content. Thus it can be used to analyze a question and to extract entities as possible answers to a question from a collection of documents.

As further shown in greater detail in the architecture diagram of FIG. 5, the "Query Analysis" module 20 receives an input that comprises the query 19 entered, for example, by a user via their web-based browser device. An input query 19 may comprise a text string. The query analysis block 20 includes additionally a Lexical Answer Type (LAT) block 200 that implements functions and programming interfaces to provide additional constraints on the answer type (LAT). The computation in the block 20 comprises but is not limited to the Lexical Answer Type. In one embodiment, the LAT detection block 200 may include the LAT confidence estimation functionality for the detected LAT.

As mentioned above, a LAT of the question/query is the type (i.e. the descriptor) of the referent of the entity that is a valid answer to the question. In practice, LAT is the descriptor of the answer detected by a natural language understanding module comprising a collection of patterns and/or a parser with a semantic interpreter. With reference to the Lexical Answer Type (LAT) block 200, in the query analysis module 20 of FIG. 5, the LAT represents the question terms that identify the semantic type of the correct answer. In one embodiment, as known, a LAT may be detected in a question through pattern LAT detection rules. These rules are implemented and can be encoded manually or learned by machine automatically through association rule learning. In this case, the natural language understanding model can be limited to implementation the rules.

Figure 6:
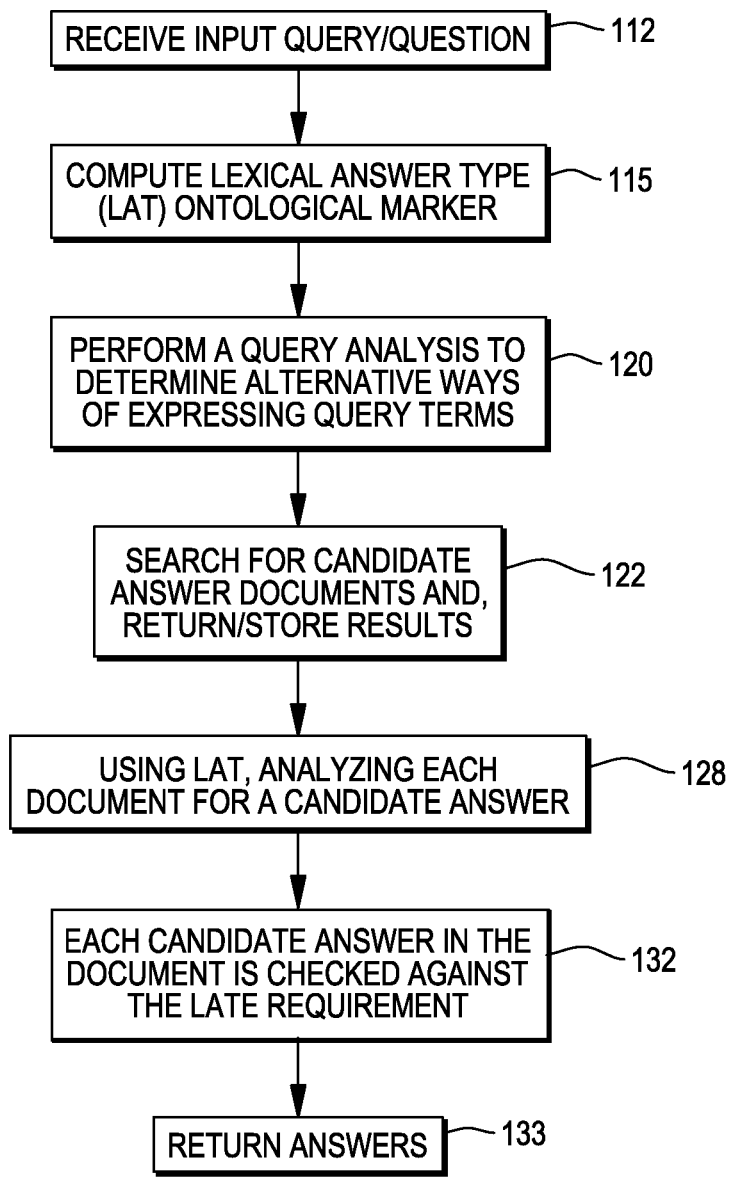
FIG. 6 illustrates an example flow diagram for conducting questions and answers processing with deferred type evaluation.

FIG. 6 is a flow diagram of a computer programmed method 100 for conducting questions and answers with deferred type evaluation in one embodiment as described in Ser. No. 12/126,642. Generally, in the method of "deferred type evaluation" depicted in FIG. 6, a first processing step 112 represents the step of receiving, at a processing device, an input query, and generating a data structure, e.g., a CAS structure, including a question string and context for input to a Lexical Answer Type (LAT) processing unit block 200 (FIG. 5) where, as indicated at step 115, the Query is analyzed and lexical answer type (LAT) and LAT confidence score is computed. As a result of processing in the LAT processing component, as run at step 115, there is generated an output data structure, e.g., a CAS structure, including the computed LAT and possibly additional terms from the original question.

As result of processing in the LAT block 200 then, as typified at step 120, there is generated an output data structure, e.g., a CAS structure, including the computed original query (terms, weights) (as described in co-pending U.S. patent application Ser. No. 12/152,441 the whole contents and disclosure of which is incorporated by reference as if fully set forth herein.

Returning to FIG. 6, at processing step 122, there is performed the step of searching for candidate answer documents, and returning the results.

As a result of processing in a candidate answer generation module, as typified at step 122, there is generated an output data structure, e.g., a CAS structure, including all of the documents found from the data corpus (e.g., primary sources and knowledge base).

In FIG. 6, step 128, there is depicted the step of analyzing each document for a candidate answer to produce a set of candidate answers which may be output as a CAS structure using LAT (the lexical answer type).

For the example questions discussed herein, as a result of processing in the candidate answer generation module 30, as typified at step 132, FIG. 6, those candidate answers that are found in the document is checked against the query LAT requirement and will be returned as answer(s) at step 133 (based on their scores).

In candidate answer to instance matching, the candidate is matched against an instance or instances within the knowledge resource, where the form the instance takes depends on the knowledge resource. With a structured knowledge base, instances may be entities, with an encyclopedic source such as Wikipedia instances may be entries in the encyclopedia, with lexical resources such as the WordNet® lexical database (A trademark of the Trustees of Princeton University) instances may be synset entries (sets of synonyms), and with unstructured document (or webpage) collections, instances may be any terms or phrases occurring within the text. If multiple instances are found, a rollup using an aggregation function is employed to combine the scores from all candidates. If no suitable instance is found, a score of 0 is returned.

Next, instance association information is extracted from the resource. This information associates each instance with a type or set of types. Depending on the resource, this may take different forms; in a knowledge base, this corresponds to particular relations of interest that relate instances to types, with an encyclopedic source, this could be lexical category information which assigns a lexical type to an entity, with lexical resources such as WordNet®, this is a set of lexical relations, such as hyponymy, over synsets (e.g. "artist" is a "person"), and with unstructured document collections this could be co-occurrence or proximity to other terms and phrases representing type.

Then, each LAT is then attempted to match against each type. A lexical manifestation of the type is used. For example, with encyclopedias, this could be the string representing the category, with a lexical resource such as WordNet®, this could be the set of strings contained within the synset. The matching is performed by using string matching or additional lexical resources such as Wordnet® to check for synonymy or hyponymy between the LAT and type. Special logic may be implemented for types of interest; for example person matcher logic may be activated which requires not a strict match, synonym, or hyponym relation, but rather that both LAT and type are hyponyms of the term "person". In this way, "he" and "painter", for example, would be given a positive score even though they are not strictly synonyms or hyponyms. Finally, the set of pairs of scores scoring the degree of match may be resolved to a single final score via an aggregation function.

Figure 7:
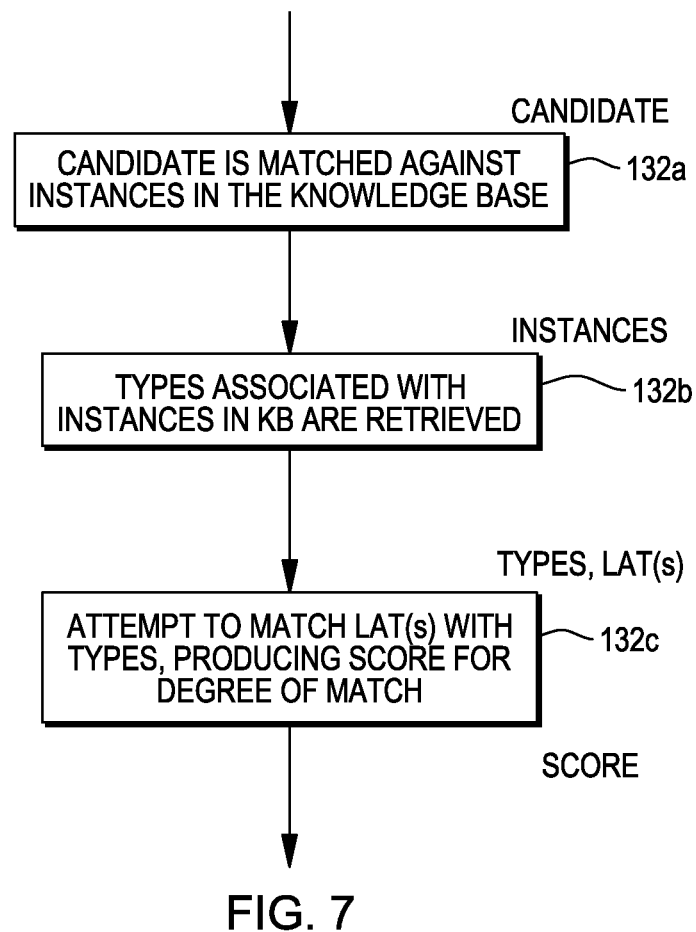
FIG. 7 is a flow diagram illustrating TyCor score production performed at step 132 of the flow diagram of FIG. 6 in one embodiment.

Thus, an implementation set forth in steps 132a-132c of FIG. 7, for an example question, each candidate answer is automatically checked against the LAT requirement. This may be performed by the Candidate Answer Scoring block 40, shown in FIG. 5, as part of the evidence gathering module 50, and particularly, a Candidate Answer Type Analysis module 400 that produces a probability measure that Candidate Answer is of the correct type based, e.g., on a grammatical and semantic analysis of the document with which the Candidate Answer appears. As described, this processing entails using an automated scoring function that can be expressed as a weighted combination of different typing scores, and, in one example embodiment, it may be expressed as $$TyCorScore=0.2*TyCorWordNet+0.5*TyCorKB+0.4*TyCorDoc$$

Other combinations of scores are possible, and the optimal scoring function can be learned as described in the co-pending U.S. patent application Ser. No. 12/152,441, filed May 14, 2008, the content and disclosure of which is incorporated by reference as if fully set forth herein.

The scoring function itself is a mathematical expression, that—in one embodiment—could be based on the logistic regression function (a composition of linear expressions with the exponential function), and may be applied to a much larger number of typing scores.

The output of the "Candidate Answer Scoring" module 40 is a CAS structure having a list of answers with their scores given by the processing modules in the answer scoring modules included in the Candidate Answer Scoring block 40 of the evidence gathering module 50. In one embodiment, these candidate answers are provided with the TyCor matching score combined with the weighted confidence score as described herein above.

Finally, returning to FIG. 6, at step 133, the top candidate answers (based on their TyCor scores) are returned and/or further processed for combination with respective computed weighted LAT confidence scores in the manner as described herein.

In one embodiment, the above-described modules of FIGS. 1 and 5 can be represented as functional components in UIMA is preferably embodied as a combination of hardware and software for developing applications that integrate search and analytics over a combination of structured and unstructured information. The software program that employs UIMA components to implement end-user capability is generally referred to as the application, the application program, or the software application.

The UIMA high-level architecture, one embodiment of which is illustrated in FIG. 5, defines the roles, interfaces and communications of large-grained components that cooperate to implement UIM applications. These include components capable of analyzing unstructured source artifacts, such as documents containing textual data and/or image data, integrating and accessing structured sources and storing, indexing and searching for artifacts based on discovered semantic content.

Although not shown, a non-limiting embodiment of the UIMA high-level architecture includes a Semantic Search Engine, a Document Store, at least one Text Analysis Engine (TAE), at least one Structured Knowledge Source Adapter, a Collection Processing Manager, at least one Collection Analysis Engine, all interfacing with Application logic. In one example embodiment, the UIMA operates to access both structured information and unstructured information to generate candidate answers and an answer in the manner as discussed herein. The unstructured information may be considered to be a collection of documents, and can be in the form of text, graphics, static and dynamic images, audio and various combinations thereof.

Figure 8:
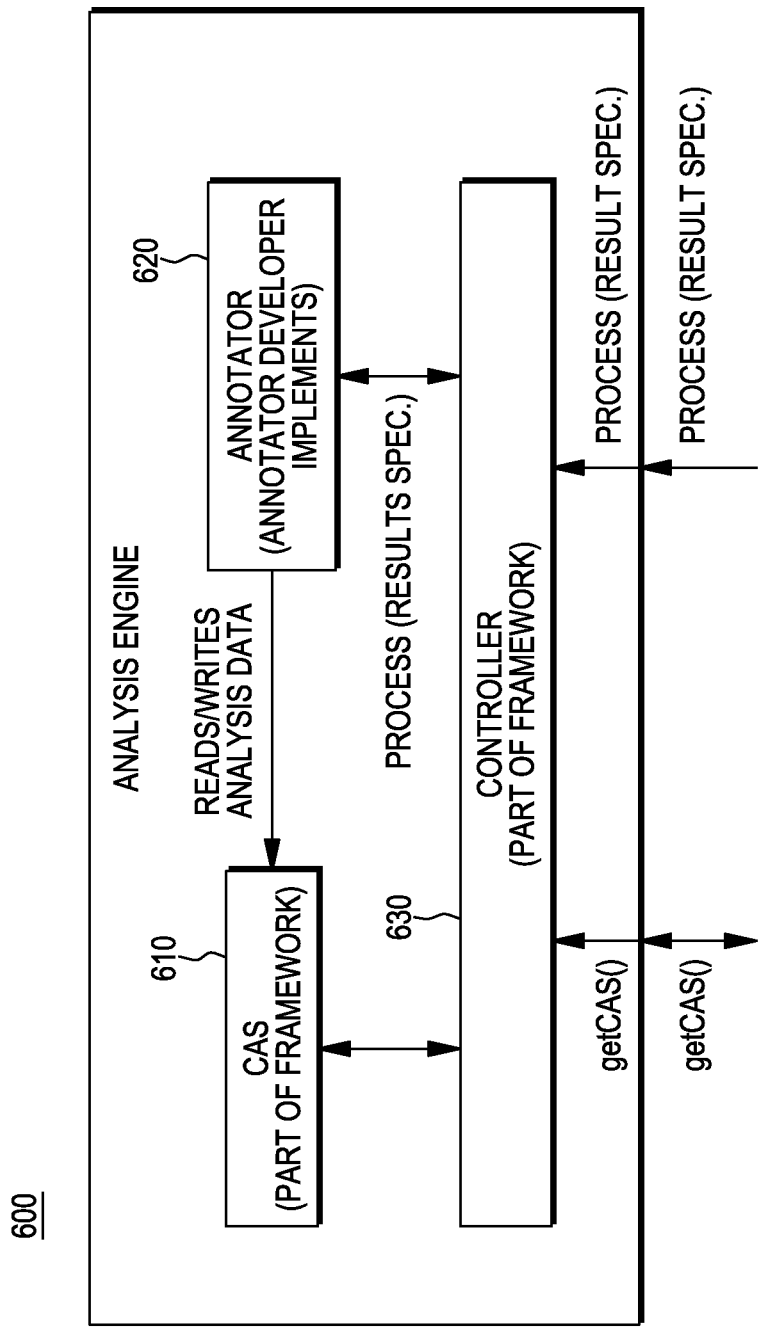
FIG. 8 depicts an aspect of a UIMA framework implementation for providing one type of analysis engine for processing CAS data structures.

Aspects of the UIMA are further shown in FIG. 8, where there is illustrated a Analysis Engine (AE) 600 that can be a component part of the Text Analysis Engine (TAE). Included in the AE 600 is a Common Analysis System (CAS) 610, an annotator 620 and a controller 630. A second embodiment of a TAE (not shown) includes an aggregate Analysis Engine composed of two or more component analysis engines as well as the CAS, and implements the same external interface as the AE 600.

Common Analysis System 610

The Common Analysis System (CAS) 610 is provided as the common facility that all Annotators 620 use for accessing and modifying analysis structures. Thus, the CAS 610 enables coordination between annotators 620 and facilitates annotator 620 reuse within different applications and different types of architectures (e.g. loosely vs. tightly coupled). The CAS 610 can be considered to constrain operation of the various annotators.

The CAS 610 principally provides for data modeling, data creation and data retrieval functions. Data modeling preferably defines a tree hierarchy of (data) types, as shown in the example Table 1 provided below. The types have attributes or properties referred to as features. In preferred embodiments, there are a small number of built-in (predefined) types, such as integer (int), floating point (float) and string; UIMA also includes the predefined data type "Annotation". The data model is defined in the annotator descriptor, and shared with other annotators. In the Table 1, some types? that are considered extended from prior art unstructured information management applications to accommodate question answering in the preferred embodiment of the invention include:

TABLE 1

| TYPE (or feature) | TYPE's PARENT (or feature type) |
| --- | --- |
| Query Record | Top |
| Query | Query Record |
| Query Context | Query Record |
| Candidate Answer Record | Annotation |
| Candidate Answer | Candidate Answer Record |
| Feature: CandidateAnswerScore | Float |
| QueryLexical Answer Type | Annotation |
| CandidateAnswer AT | Annotation |
| Feature: TyCorScore | Float |

In Table 1, for example, all of the question answering types (list in the left column) are new types and extend either another new type or an existing type (shown in the right column). For example, both Query and Query Context are kinds of Query Record, a new type; while Candidate Answer Record extends the UIMA type Annotation, but adds a new feature CandidateAnswerScore which is a Float. In addition, Table 1 describes the query LAT as having a UIMA Annotation type; CandidateAnswerAT is also an Annotation, but with an additional feature TyCorScore of type Float.

CAS 610 data structures may be referred to as "feature structures". To create a feature structure, the type must be specified (see TABLE 1). Annotations (and—feature structures) are stored in indexes.

The CAS 610 may be considered to be a collection of methods (implemented as a class, for example, in Java or C++) that implements an expressive object-based data structure as an abstract data type. Preferably, the CAS 610 design is largely based on a TAE Feature-Property Structure, that provides user-defined objects, properties and values for flexibility, a static type hierarchy for efficiency, and methods to access the stored data through the use of one or more iterators.

The abstract data model implemented through the CAS 610 provides the UIMA 100 with, among other features: platform independence (i.e., the type system is defined declaratively, independently of a programming language); performance advantages (e.g., when coupling annotators 610 written in different programming languages through a common data model); flow composition by input/output specifications for annotators 610 (that includes declarative specifications that allow type checking and error detection, as well as support for annotators (TAE) as services models); and support for third generation searching procedures through semantic indexing, search and retrieval (i.e. semantic types are declarative, not key-word based).

The CAS 610 provides the annotator 620 with a facility for efficiently building and searching an analysis structure. The analysis structure is a data structure that is mainly composed of meta-data descriptive of sub-sequences of the text of the original document. An exemplary type of meta-data in an analysis structure is the annotation. An annotation is an object, with its own properties, that is used to annotate a sequence of text. There are an arbitrary number of types of annotations. For example, annotations may label sequences of text in terms of their role in the document's structure (e.g., word, sentence, paragraph etc), or to describe them in terms of their grammatical role (e.g., noun, noun phrase, verb, adjective etc.). There is essentially no limit on the number of, or application of, annotations. Other examples include annotating segments of text to identify them as proper names, locations, military targets, times, events, equipment, conditions, temporal conditions, relations, biological relations, family relations or other items of significance or interest.

Typically an Annotator's 620 function is to analyze text, as well as an existing analysis structure, to discover new instances of the set of annotations that it is designed to recognize, and then to add these annotations to the analysis structure for input to further processing by other annotators 620.

In addition to the annotations, the CAS 610 of FIG. 7 may store the original document text, as well as related documents that may be produced by the annotators 620 (e.g., translations and/or summaries of the original document). Preferably, the CAS 610 includes extensions that facilitate the export of different aspects of the analysis structure (for example, a set of annotations) in an established format, such as XML.

More particularly, the CAS 610 is that portion of the TAE that defines and stores annotations of text. The CAS API is used both by the application and the annotators 620 to create and access annotations. The CAS API includes, preferably, at least three distinct interfaces. A Type system controls creation of new types and provides information about the relationship between types (inheritance) and types and features. One non-limiting example of type definitions is provided in TABLE 1. A Structure Access Interface handles the creation of new structures and the accessing and setting of values. A Structure Query Interface deals with the retrieval of existing structures.

The Type system provides a classification of entities known to the system, similar to a class hierarchy in object-oriented programming. Types correspond to classes, and features correspond to member variables. Preferably, the Type system interface provides the following functionality: add a new type by providing a name for the new type and specifying the place in the hierarchy where it should be attached; add a new feature by providing a name for the new feature and giving the type that the feature should be attached to, as well as the value type; and query existing types and features, and the relations among them, such as "which type(s) inherit from this type".

Preferably, the Type system provides a small number of built-in types. As was mentioned above, the basic types are int, float and string. In a Java implementation, these correspond to the Java int, float and string types, respectively. Arrays of annotations and basic data types are also supported. The built-in types have special API support in the Structure Access Interface.

The Structure Access Interface permits the creation of new structures, as well as accessing and setting the values of existing structures. Preferably, this provides for creating a new structure of a given type; getting and setting the value of a feature on a given structure; and accessing methods for built-in types. Feature definitions are provided for domains, each feature having a range.

In an alternative environment, modules of FIGS. 1, 5 can be represented as functional components in GATE (General Architecture for Text Engineering) (see: http://gate.ac.uk/releases/gate-2.0alpha2-build484/doc/userguide.html). Gate employs components which are reusable software chunks with well-defined interfaces that are conceptually separate from GATE itself. All component sets are user-extensible and together are called CREOLE—a Collection of REusable Objects for Language Engineering. The GATE framework is a backplane into which plug CREOLE components. The user gives the system a list of URLs to search when it starts up, and components at those locations are loaded by the system. In one embodiment, only their configuration data is loaded to begin with; the actual classes are loaded when the user requests the instantiation of a resource). GATE components are one of three types of specialized Java Beans: 1) Resource: The top-level interface, which describes all components. What all components share in common is that they can be loaded at runtime, and that the set of components is extendable by clients. They have Features, which are represented externally to the system as eta-data? in a format such as RDF, plain XML, or Java properties. Resources may all be Java beans in one embodiment. 2) ProcessingResource: Is a resource that is runnable, may be invoked remotely (via RMI), and lives in class files. In order to load a PR (Processing Resource) the system knows where to find the class or jar files (which will also include the metadata); 3) LanguageResource: Is a resource that consists of data, accessed via a Java abstraction layer. They live in relational databases; and, VisualResource: Is a visual Java bean, component of GUIs, including of the main GATE gui. Like PRs these components live in .class or .jar files.

In describing the GATE processing model any resource whose primary characteristics are algorithmic, such as parsers, generators and so on, is modelled as a Processing Resource. A PR is a Resource that implements the Java Runnable interface. The GATE Visualisation Model implements resources whose task is to display and edit other resources are modelled as Visual Resources. The Corpus Model in GATE is a Java Set whose members are documents. Both Corpora and Documents are types of Language Resources (LR) with all LRs having a Feature Map (a Java Map) associated with them that stored attribute/value information about the resource. FeatureMaps are also used to associate arbitrary information with ranges of documents (e.g. pieces of text) via an annotation model. Documents have a DocumentContent which is a text at present (future versions may add support for audiovisual content) and one or more AnnotationSets which are Java Sets.

As UIMA, GATE can be used as a basis for implementing natural language dialog systems and multimodal dialog systems having the disclosed question answering system as one of the main submodules. The references, incorporated herein by reference above (U.S. Pat. Nos. 6,829,603 and 6,983,252, and 7,136,909) enable one skilled in the art to build such an implementation.

FIG. 8 illustrates an exemplary hardware configuration of a computing system 401 in which the present system and method may be employed. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s).

It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for extracting features from a query comprising a text string, said method comprising:
    identifying a syntactic pattern rule associated with said query, said pattern rule identified from a set of pattern rules that define common lexical answer types (LATs), a first feature of said extracted features comprising an identified pattern rule;
    checking for prior instances of a detected lexical answer type (LAT) and computing a LAT word frequency based on said prior instances, a second feature of said extracted features comprising a computed frequency of a query word being a candidate LAT;
    obtaining a parse tree data structure associated with said query;
    identifying grammatical relations amongst words associated with said candidate LAT in said parse tree structure, a third feature of said extracted features comprising a part of speech of the candidate LAT;
    determining whether the candidate LAT word co-references some other word in said query recognized as a LAT, a fourth feature of said extracted features comprising a co-reference information, and
    applying a model to said extracted first, second, third and fourth features to produce a confidence value representing an estimated accuracy of a detected query LAT,
    wherein one or more programmed processor devices performs said identifying a syntactic pattern rule, checking for prior instances, obtaining the parse tree data structure, identifying grammatical relations, and determining LAT word co-references, and model applying.

2. The method of claim 1, wherein said one or more programmed processor devices performs extracting said one or more first, second, third and fourth features in parallel.

3. The method of claim 2, wherein said applied model is one or more of: a logistic regression model or a decision tree model constructed manually or automatically from prior sets of training instances.

4. The method of claim 2, wherein said identifying grammatical relations amongst words comprises: traversing said parse tree.

5. The method of claim 2, further comprising:
    computing a first score based on said confidence value of a detected LAT associated with said query, wherein said first score is indicative of a quality of said query LAT;
    obtaining a candidate answer to said query from an information source;
    determining an answer type (AT) for said candidate answer;
    comparing said detected query LAT with said candidate answer AT;
    computing a second score representing a degree of match between said compared query LAT with said candidate answer AT; and
    combining said first score and said second score to provide a total score indicative of a quality of said candidate answer.
    wherein one or more programmed processor devices performs one or more of said computing said first score and second score, obtaining candidate answers, determining an AT, comparing and combining.

6. The method of claim 5, wherein said computing a second score representing a degree of match between said compared query LAT with said candidate answer AT includes:
    matching said candidate answer against instances in a corpus or a knowledge base;
    retrieving a type associated with an instance in the corpus or the knowledge base; and,
    matching said query LAT with said retrieved type to produce a type coercion (TyCor) value, said second score comprising said TyCor value.

7. The method of claim 6, wherein a query has up to n candidate LATs, said combining to provide said total score is a summation according to:

(confidence score$_{LAT1}$)(TyCor$_{LAT1}$)+(confidence score$_{LAT2}$)(TyCor$_{LAT2}$)+ . . . +(confidence score$_{LATn}$)(TyCor$_{LATn}$)

wherein confidence score$_{LAT1}$, confidence score$_{LAT2}$, and confidence score$_{LATn}$ are produced confidence values representing estimated accuracies of each determined LAT of said query, and TyCor$_{LAT1}$, TyCor$_{LAT2}$, and TyCor$_{LATn}$ are the produced type coercion (TyCor) values of a candidate answer with each LAT.

8. A system for extracting features from a query comprising a text string, said system comprising:
    a memory storage device;
    one or more processor devices, each in communication to said memory device and configured to perform a method to:

identify a syntactic pattern rule associated with said query, said pattern rule identified from a set of pattern rules that define common lexical answer types (LATs), a first feature of said extracted features comprising an identified pattern rule;

check for prior instances of a detected lexical answer type (LAT) and computing a LAT word frequency based on said prior instances, a second feature of said extracted features comprising a computed frequency of a query word being a candidate LAT;

obtain a parse tree data structure associated with said query;

identify grammatical relations amongst words associated with said candidate LAT in said parse tree structure, a third feature of said extracted features comprising a part of speech of the candidate LAT, determine whether the candidate LAT word co-references some other word in said query recognized as a LAT, a fourth feature of said extracted features comprising a co-reference information, and apply a model to said extracted first, second, third and fourth features to produce a confidence value representing an estimated accuracy of a detected query LAT.

9. The system of claim 8, wherein said one or more programmed processor devices performs extracting said one or more first, second, third and fourth features in parallel.

10. The system of claim 9, wherein said applied model is one or more of: a logistic regression model or a decision tree model constructed manually or automatically from prior sets of training instances.

11. The system of claim 9, wherein said identifying grammatical relations amongst words comprises: traversing said parse tree.

12. The system of claim 9, further configured to perform a method to:
compute a first score based on said confidence value of a detected LAT associated with said query, wherein said first score is indicative of a quality of said query LAT;
obtain a candidate answer to said query from an information source;
determine an answer type (AT) for said candidate answer;
compare said detected query LAT with said candidate answer AT;
compute a second score representing a degree of match between said compared query LAT with said candidate answer AT; and
combine said first score and said second score to provide a total score indicative of a quality of said candidate answer.

13. The system of claim 12, wherein to compute a second score representing a degree of match between said compared query LAT with said candidate answer AT includes further configuring said one or more processor devices to:
match said candidate answer against instances in a corpus or a knowledge base;
retrieve a type associated with an instance in the corpus or the knowledge base; and,
match said query LAT with said retrieved type to produce a type coercion (TyCor) value, said second score comprising said TyCor value.

14. The system of claim 13, wherein a query has up to n candidate LATs, said combining to provide said total score is a summation according to:

$$(\text{confidence score}_{LAT1})(\text{TyCor}_{LAT1}) + (\text{confidence score}_{LAT2})(\text{TyCor}_{LAT2}) + \ldots + (\text{confidence score}_{LATn})(\text{TyCor}_{LATn})$$

wherein confidence score$_{LAT1}$, confidence score$_{LAT2}$, and confidence score$_{LATn}$ are produced confidence values representing estimated accuracies of each determined LAT of said query, and TyCor$_{LAT1}$, TyCor$_{LAT2}$, and TyCor$_{LATn}$ are the produced type coercion (TyCor) values of a candidate answer with each LAT.

15. A computer program product for automatically extracting features from a query comprising a text string, the computer program device comprising a storage medium readable by a processing circuit and storing instructions run by the processing circuit for performing a method, the method comprising:
identifying a syntactic pattern rule associated with said query, said pattern rule identified from a set of pattern rules that define common lexical answer types (LATs), a first feature of said extracted features comprising an identified pattern rule;
checking for prior instances of a detected lexical answer type (LAT) and computing a LAT word frequency based on said prior instances, a second feature of said extracted features comprising a computed frequency of a query word being a candidate LAT;
obtaining a parse tree data structure associated with said query;
identifying grammatical relations amongst words associated with said candidate LAT in said parse tree structure, a third feature of said extracted features comprising a part of speech of the candidate LAT,
determining whether the candidate LAT word co-references some other word in said query recognized as a LAT, a fourth feature of said extracted features comprising a co-reference information, and
applying a model to said extracted first, second, third and fourth features to produce a confidence value representing an estimated accuracy of a detected query LAT.

16. The computer program product of claim 15, wherein said one or more programmed processor devices performs extracting said one or more first, second, third and fourth features in parallel.

17. The computer program product of claim 16, wherein said applied model is one or more of: a logistic regression model or a decision tree model constructed manually or automatically from prior sets of training instances.

18. The computer program product of claim 16, wherein said identifying grammatical relations amongst words comprises: traversing said parse tree.

19. The computer program product of claim 16, wherein said method further comprises:
computing a first score based on said confidence value of a detected LAT associated with said query, wherein said first score is indicative of a quality of said query LAT;
obtaining a candidate answer to said query from an information source;
determining an answer type (AT) for said candidate answer;
comparing said detected query LAT with said candidate answer AT;
computing a second score representing a degree of match between said compared query LAT with said candidate answer AT; and
combining said first score and said second score to provide a total score indicative of a quality of said candidate answer.

20. The computer program product of claim 19, wherein said computing a second score representing a degree of match between said compared query LAT with said candidate answer AT includes:

matching said candidate answer against instances in a corpus or a knowledge base;

retrieving a type associated with an instance in the corpus or the knowledge base; and, matching said query LAT with said retrieved type to produce a type coercion (TyCor) value, said second score comprising said TyCor value.

21. The computer program product of claim 20, wherein a query has up to n candidate LATs, said combining to provide said total score is a summation according to:

$$(\text{confidence score}_{LAT1})(\text{TyCor}_{LAT\ 1}) + (\text{confidence score}_{LAT2})(\text{TyCor}_{LAT\ 2}) + \ldots + (\text{confidence score}_{LATn})(\text{TyCor}_{LATn})$$

wherein confidence score$_{LAT1}$, confidence score$_{LAT2}$, and confidence score$_{LATn}$ are produced confidence values representing estimated accuracies of each determined LAT of said query, and TyCor$_{LAT1}$, TyCor$_{LAT2}$, and TyCor$_{LATn}$ are the produced type coercion (TyCor) values of a candidate answer with each LAT.

* * * * *